(12) United States Patent
Rogers

(10) Patent No.: US 8,215,698 B1
(45) Date of Patent: Jul. 10, 2012

(54) ADAPTER PLATE FOR A TARP SYSTEM FOR A SIDE-DUMP TRAILER OR TRUCK

(76) Inventor: Ralph R. Rogers, Dakota Dunes, SD (US)

( * ) Notice: Subject to any disclaimer, the term of this patent is extended or adjusted under 35 U.S.C. 154(b) by 0 days.

(21) Appl. No.: 13/135,850

(22) Filed: Jul. 15, 2011

(51) Int. Cl.
*B60P 7/04* (2006.01)
*B60P 1/16* (2006.01)

(52) U.S. Cl. .......................................................... 296/98

(58) Field of Classification Search .................. 296/98; 298/23 R, 23 C
See application file for complete search history.

(56) References Cited

U.S. PATENT DOCUMENTS

| | | | |
|---|---|---|---|
| 5,002,328 A | 3/1991 | Michel | |
| 6,206,449 B1 | 3/2001 | Searfoss | |
| 6,942,274 B2 * | 9/2005 | Henning | 296/98 |
| 7,032,950 B2 | 4/2006 | Eggers et al. | |
| 7,611,187 B1 | 11/2009 | Rogers | |
| 7,841,668 B2 | 11/2010 | Rogers | |
| 2010/0283285 A1 * | 11/2010 | Cramaro et al. | 296/98 |

* cited by examiner

*Primary Examiner* — Dennis Pedder
(74) *Attorney, Agent, or Firm* — Dennis L. Thomte

(57) ABSTRACT

A front adapter plate has its upper end mounted on the pivot pin which pivotally secures the rod end of a front hydraulic cylinder of a side-dump body. A front mount is adjustably vertically secured to the front adapter plate and has a pivot pin extending forwardly therefrom. A rear adapter plate has its upper end mounted on the pivot pin which pivotally secures the rod end of a rear hydraulic cylinder of the side-dump body. A rear mount is adjustably vertically secured to the rear adapter plate and has a pivot pin extending rearwardly therefrom. The inner ends of front and rear swing arms of a tarp system are pivotally mounted on the pivot pins of the front and rear mounts respectively.

4 Claims, 5 Drawing Sheets

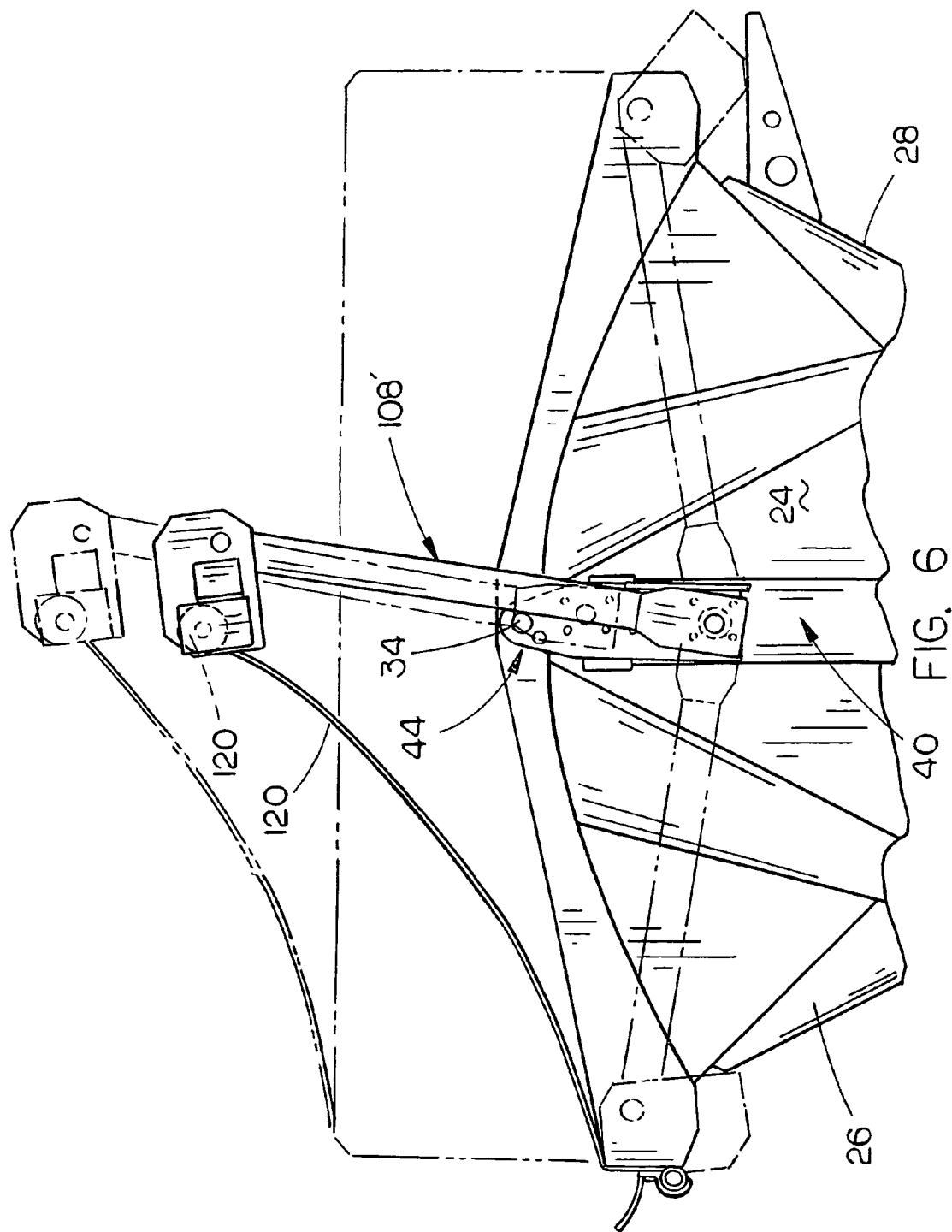

ADAPTER PLATE FOR A TARP SYSTEM FOR A SIDE-DUMP TRAILER OR TRUCK

BACKGROUND OF THE INVENTION

1. Field of the Invention

This invention relates to a tarp system for a side-dump trailer or truck and more particularly to an adapter plate for a tarp system for a side-dump trailer or truck. More particularly, an adapter plate is secured to the upper pivot pin of the front hydraulic cylinder of the side-dump body. An adapter plate is also secured to the upper pivot pin of the rear hydraulic cylinder of the side-dump body. The swing arms of the tarp system are selectively vertically adjustably and pivotally secured to the adapter plates.

2. Description of the Related Art

In recent years, side-dump bodies mounted on trailers or trucks have become extremely popular. The assignee of the instant invention has obtained many patents on side dump bodies with one of the first patents being U.S. Pat. No. 5,480,214 to Ralph Rogers.

Tarp systems have been previously provided for side-dump trailers such as U.S. Pat. Nos. 7,032,950 and 6,206,449. In U.S. Pat. No. 7,032,950, the swing arms thereof are pivotally secured to a spring mount or bracket which is positioned below the upper end of each of the front and rear walls of the side-dump body. In U.S. Pat. No. 6,206,449, the swing arms are connected to brackets secured to the forward and rearward ends of the side-dump body. The requirement of the spring mount or bracket in U.S. Pat. No. 7,032,950 and the bracket in U.S. Pat. No. 6,206,449 requires additional fabrication steps and adds additional weight to the side-dump body. Further, the fact that the swing arms have their inner or lower ends positioned considerably below the upper ends of the forward and rearward end walls of the side-dump body restricts their reach. This is particularly true when the side-dump body has extenders at the upper ends thereof, such as disclosed in U.S. Pat. No. 7,841,668 which issued on Nov. 30, 2010 entitled A SIDE-DUMP BODY HAVING AN INCREASED CARRYING CAPACITY. The swing arms of the prior art are not believed to be capable to move a tarp over the upper ends of a side-dump body having extenders extending upwardly from the upper edges thereof.

Applicant's earlier invention disclosed in U.S. Pat. No. 7,611,187 truly represents an improvement in the tarping systems of the prior art. However, Applicant believes that the instant invention represents a further improvement in the prior art by providing a means for selectively, vertically and pivotally mounting the inner ends of the front and rear swing arms of the tarp system to adapter plates which are secured to the hydraulic cylinder upper pivot pins at the forward and rearward ends of the side-dump tub or body.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An elongated side dump body or tub is movably positioned on the wheeled frame and has a forward end, a rearward end and opposite sides. The body includes a bottom having a forward end and a rearward end. The body also includes an upstanding forward wall member with upper and lower ends, an upstanding rearward wall member with upper and lower ends, a first side wall having an upper end, and a second side wall having an upper end. The body has an open upper end for receiving material to be transported.

The side-dump trailer also includes a front hydraulic cylinder having a base end pivotally secured to the wheeled frame by a first pivot pin intermediate the sides thereof forwardly of the body and a rod end which is pivotally secured to the forward wall member adjacent the upper end thereof by a second pivot pin. A rear hydraulic cylinder is also provided which has a base end pivotally secured to the wheeled frame by a third pivot pin intermediate the sides thereof rearwardly of the body and a rod end which is pivotally secured to the rearward wall member adjacent the upper end thereof by a fourth pivot pin. The hydraulic cylinders are adapted to pivot the body, with respect to the wheeled frame, to selectively dump materials therefrom from either side of the side-dump vehicle.

A front adapter plate is provided having upper and lower ends with the upper end of the front adapter plate being mounted on the second pivot pin. The upper end of the front adapter plate is fixed to the forward end of the side-dump body at the upper end thereof. A front support is selectively vertically adjustably secured to the front adapter plate below the upper end thereof. A fifth horizontally disposed pivot pin extends forwardly from the front support.

A rear adapter plate is also provided which has upper and lower ends with the upper end of the rear adapter plate being mounted on the fourth pivot pin. The upper end of the rear adapter plate is fixed to the rearward end of the side-dump body at the upper end thereof. A rear support is selectively vertically adjustably secured to the rear adapter plate below the upper end thereof. A sixth horizontally disposed pivot pin extends rearwardly from the rear support.

A tarp roll-up system is provided for use with the side-dump body which includes a flexible tarp having a forward end, a rearward end, a first side edge and a second side edge. The first side edge of the tarp is secured to the side-dump body at one side thereof adjacent the upper end thereof. The tarp roll-up system includes an elongated tube, having forward and rearward ends, with the second side edge of the tarp being secured thereto. The tarp roll-up system also includes an elongated front swing arm, with first and second ends, and a rear swing arm, with first and second ends. The front swing arm is positioned forwardly of the forward wall member of the side-dump body and has its first end operatively pivotally secured to the fifth pivot pin on the front support. The rear swing arm is positioned pivotally of the rearward wall member of the body and has its first end operatively pivotally secured to the sixth pivot pin on the rear support.

A first selectively reversible motor is secured to the second end of the front swing arm and has a drive shaft secured to the forward end of the elongated tube for rotating the tube. The tarp roll-up system also includes a second selectively reversible motor which is secured to the second end of the rear swing arm and which has a drive shaft secured to the rearward end of the elongated tube for rotating the tube.

The front and rear swing arms are movable from a first position wherein the motors thereon are positioned adjacent one side of the body, with the tarp being rolled upon the elongated tube, to a second position wherein the motors are positioned adjacent the other side of the body with the tarp extending over the upper end of the body. A spring means is associated with each of the swing arms which yieldably urge the swing arms from their second position to their first position.

It is therefore a principal object of the invention to provide an improved tarp system for a side-dump trailer or truck.

A further object of the invention is to provide an improved tarp system for a side-dump trailer or truck including adapter plates mounted on the forward and rearward ends of the body of the side dump trailer or truck with the ends of the swing arms of the tarp system being selectively vertically adjustably secured to the adapter plates.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is a partial rear view of the tarp system of this invention;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
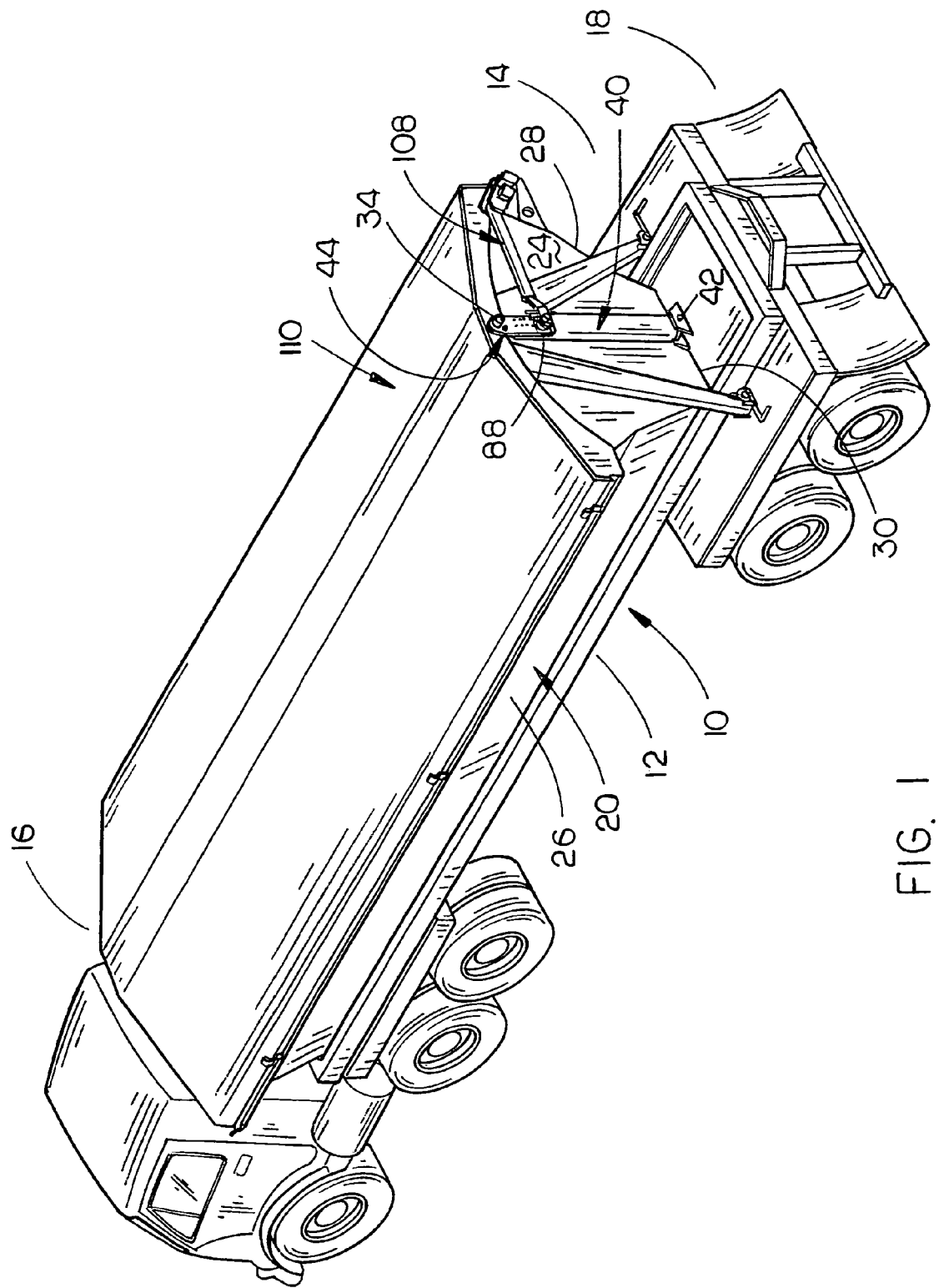
FIG. 1 is a rear perspective view of a side dump truck having the improved tarp system of this invention mounted thereon.

In FIG. 1, a side-dump body is illustrated as being mounted on a trailer such as disclosed in U.S. Pat. No. 5,480,214. In FIG. 6, the side dump body has extenders mounted on the upper end thereof as disclosed in U.S. Pat. No. 7,841,668 which issued on Nov. 30, 2010 entitled A SIDE-DUMP BODY HAVING AN INCREASED CARRYING CAPACITY.

In FIG. 1, the numeral 10 refers generally to a wheeled frame which may be part of a truck or trailer. For purposes of description, the wheeled frame 10 will be described as having a first side 12, a second side 14, a forward end 16 and a rearward end 18. A conventional side-dump body such as disclosed in U.S. Pat. No. 5,480,214 is illustrated in FIG. 1 and is referred to generally by the reference numeral 20. For purpose of description, side-dump body 20 will be described as having a forward end wall 22, a rearward end wall 24, a first side wall 26, a second side wall 28, and a bottom wall 30 which may be curved or flat. Bottom 30 may be integrally formed with side walls 26 and 28.

A pivot pin 32 is provided at the upper central end of forward end wall 22 and a pivot pin 34 is provided at the upper central end of rearward end wall 24. The rod end 36 of front hydraulic cylinder 38 is pivotally mounted on pivot pin 32. The lower or base end of front hydraulic cylinder 38 is pivotally secured to a pivot pin secured to frame 10 in conventional fashion. The rod end of rear hydraulic cylinder 40 is pivotally secured to pivot pin 34. The lower end of rear hydraulic cylinder 40 is pivotally secured to a pivot pin 42 which is secured to frame 10 in conventional fashion. The side-dump body 20 may be pivotally moved from the transport position of FIG. 1 to either side of the frame 10 in conventional fashion.

Figure 2:
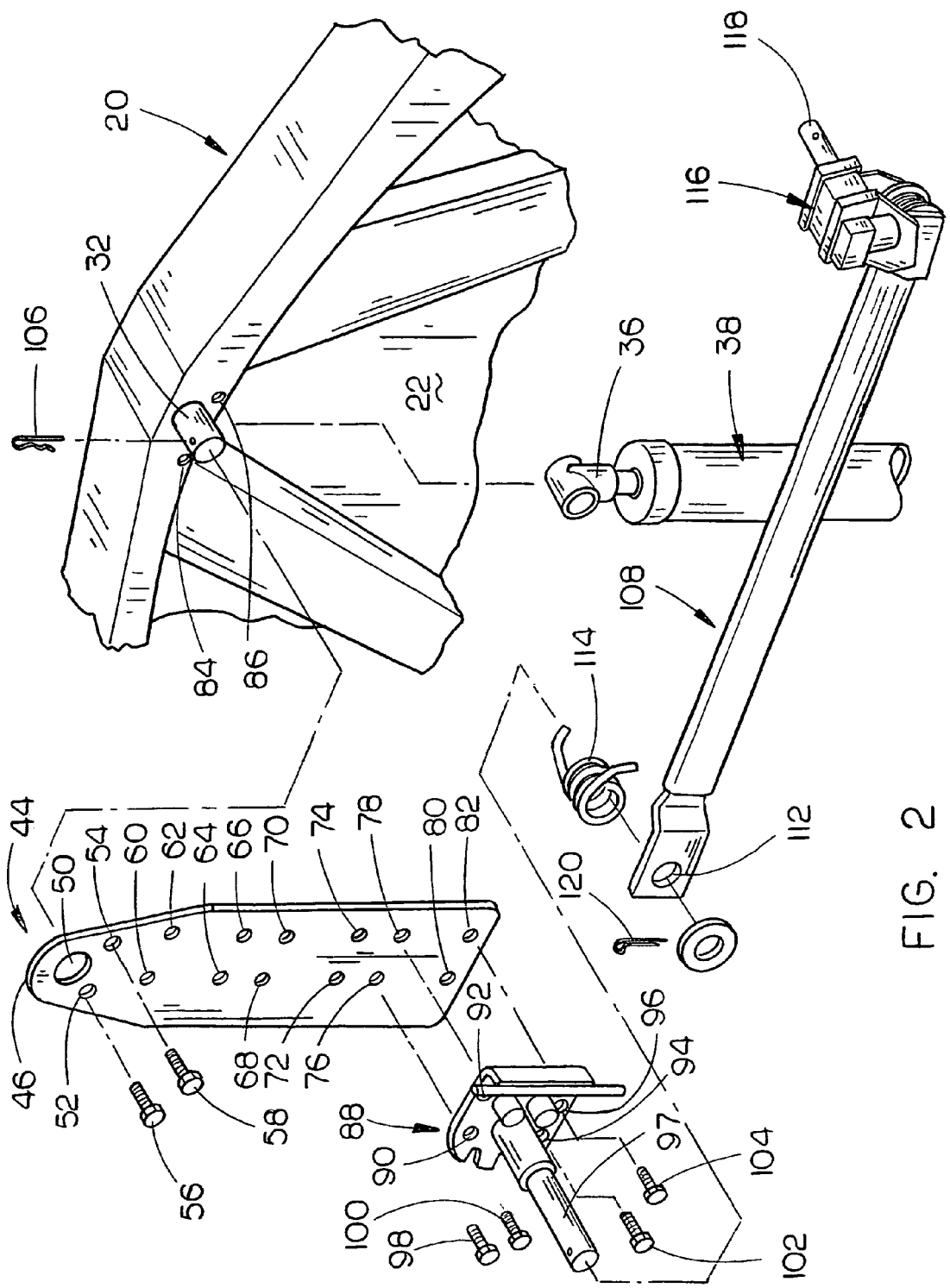
FIG. 2 is an exploded perspective view of the adapter plate of this invention and its associated structure.
Figure 5:
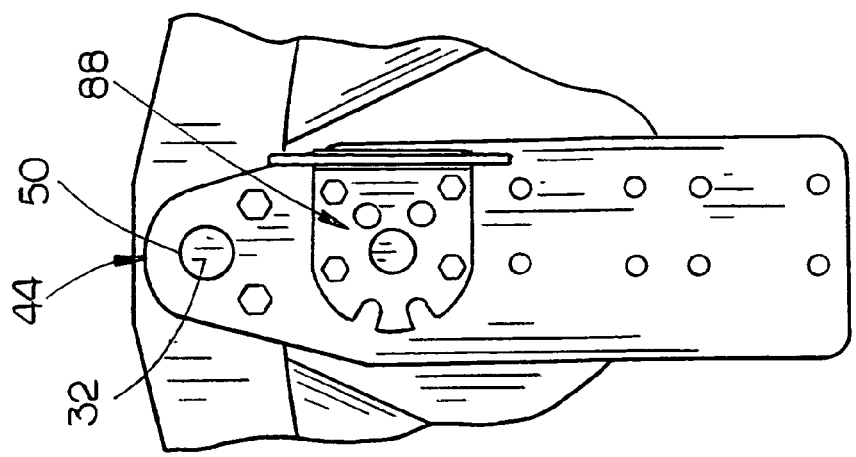
FIG. 5 is a view similar to FIGS. 3 and 4 except that the support on the adapter plate has been moved to its upper position.
Figure 4:
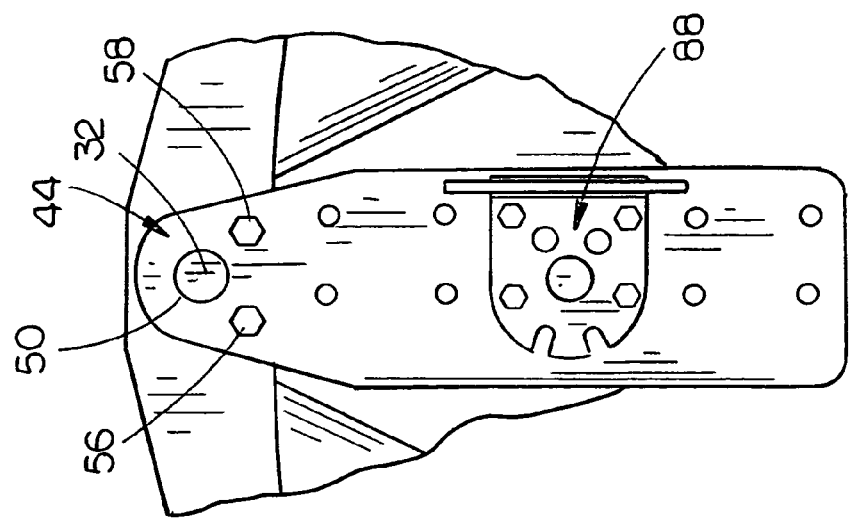
FIG. 4 is a view similar to FIG. 3 except that the support on the adapter plate has been moved upwardly on the adapter plate.
Figure 3:
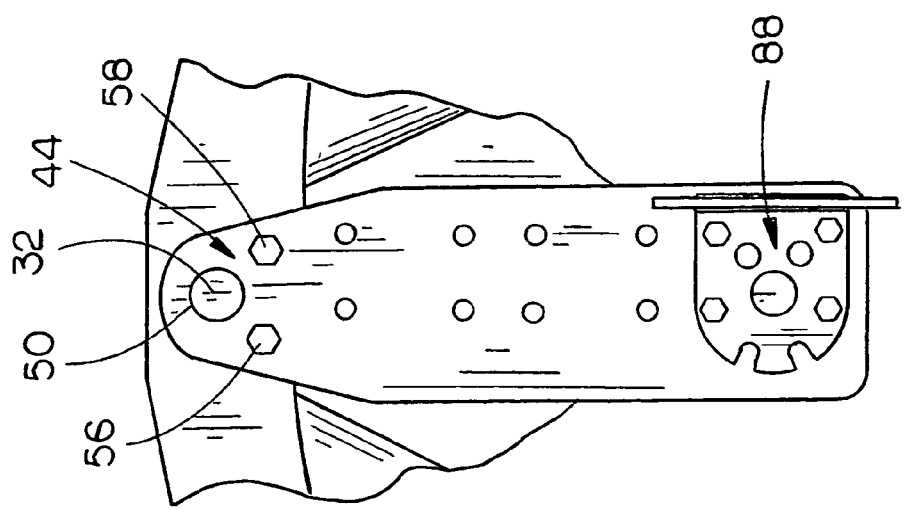
FIG. 3 is a front view of the front adapter plate.

The numeral 44 refers to the adapter plate of this invention. An adapter plate 44 is secured to the pivot pin 32 and an adapter plate 44 is secured to the pivot pin 34. Adapter plate 44 is comprised of a metal material such as steel. For purposes of description, adapter plate 44 will be described as having an upper end 46 and a lower end 48. A pivot pin opening 50 is formed in adapter plate 44 at the upper end thereof as seen in FIG. 2. Bolt openings 52 and 54 are formed in adapter plate 44 below pivot pin opening 50 and which are adapted to receive bolts 56 and 58 extending therethrough. Adapter plate 44 has an upper set of four bolt openings 60, 62, 64 and 66 formed therein. Adapter plate 44 also has an intermediate set of four bolt openings 68, 70, 72 and 74 formed therein below the upper set of bolt openings. Further, adapter plate 44 has a lower set of four bolt openings 76, 78, 80 and 82 formed therein at the lower end thereof.

Front adapter plate 44 is mounted on the front of the side-dump body 20 as follows. Front adapter plate 44 is positioned so that pivot pin opening 50 receives pivot pin 32. Bolts 56 and 58 are extended through openings 52 and 54 respectively and are received by the openings 84 and 86 in forward end wall 24 respectively. If openings 84 and 86 are not internally threaded, nuts will be threaded onto bolts 56 and 58 to maintain adapter plate 44 in position.

The numeral 88 refers to a front mount which has bolt openings 90, 92, 94 and 96 formed therein. A pivot pin 97 extends forwardly from front mount 88 as seen in FIG. 2. Front mount 88 is selectively vertically adjustably secured to front adapter plate 44 by the bolts 98, 100, 102 and 104 which extend through bolt openings 90, 92, 94 and 96 respectively and which extend through either bolt openings 60, 62, 64 and 66; or bolt openings 68, 70, 72 and 74; or bolt openings 76, 78, 80 and 82 respectively, depending upon the desired position of the front mount 88 with respect to the front adapter plate 44. Front adapter plate 44 and the rod end 36 of hydraulic cylinder 38 are maintained on pivot pin 32 by pin or key 106.

Figure 7:
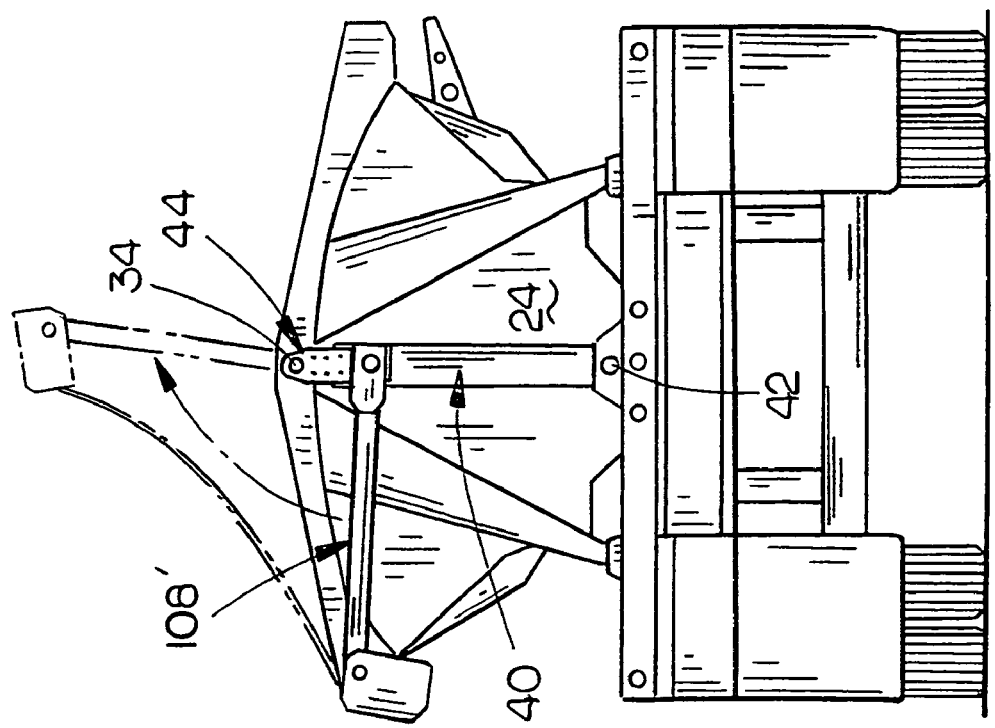
FIG. 7 is a rear view of the tarp system with the broken lines illustrating the swing arms being pivotally moved from the stowed position to the operative covering position.

The numeral 108 refers to a front swing arm assembly of the tarp system 110 of this invention, such as disclosed in U.S. Pat. No. 7,611,187. The disclosure of U.S. Pat. No. 7,611,187 is incorporated herein by reference thereto to complete this disclosure if necessary. Swing arm assembly 108 has an opening 112 at one end thereof which receives the pivot pin 97 to enable the swing arm assembly to be pivotally moved from the solid line position of FIG. 7 to the position of FIG. 8. The numeral 114 refers to a spring which is mounted on the pivot pin 97.

Figure 8:
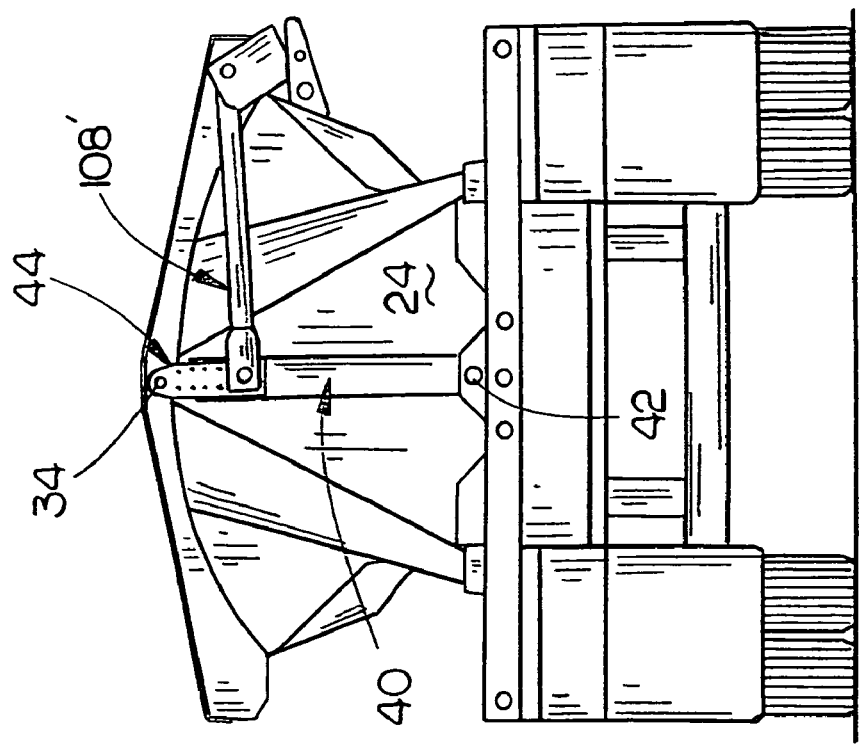
FIG. 8 is a view similar to FIG. 7 except that the tarp has been completely extended over the upper end of the body of the side-dump truck.

Spring 114 is connected to the swing arm 108 which yieldably resists the movement of the swing arm assembly from its position of FIG. 6 to the position of FIG. 8. The numeral 116 refers to an electric motor which is pivotally mounted on the other end of the spring arm assembly 108 as described in U.S. Pat. No. 7,611,187. Electric motor 116 has a drive shaft 118 extending therefrom. The electric motor 116 is a 12-volt DC motor and is selectively reversible. The power shaft or drive shaft 118 is connected to an elongated tube 120 which extends from one end of the side-dump body to the other end thereof and which has the flexible tarpaulin or tarp 120 wound thereon when the swing arm assembly is in the solid line position of FIG. 7. The tarp is rolled and unrolled in the manner disclosed in U.S. Pat. No. 7,611,187. An identical swing arm assembly 108' is secured to the rearward end of the side-dump body, the inner end of which is pivotally connected to the rear adapter plate 44 by way of the rear mount 88 and the pivot pin thereon as seen in FIG. 1. The rear adapter plate 44 is reversed with respect to the front adapter plate so that the bolt openings 60-82 are at the left side of the rear adapter plate 44.

The fact that the front mount 88 and rear mount 88 may be selectively vertically adjusted with respect to its associated adapter plate enables the inner ends of the swing arm assembly to be raised or lowered to compensate for different styles of side-dump bodies and to compensate for different heights of extenders which may be positioned at the upper end of the side-dump body.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination;
a wheeled frame;
a side-dump body, having upstanding forward and rearward ends and first and second sides, mounted on said wheeled frame;
said side-dump body having an open upper end;
a front hydraulic cylinder having a base end pivotally secured to said wheeled frame forwardly of said side-dump body by a first pivot pin, and a rod end pivotally secured to said forward end of said side-dump body at the upper end thereof by a second pivot pin;
a rear hydraulic cylinder having a base end pivotally secured to said wheeled frame rearwardly of said side-dump body by a third pivot pin and a rod end pivotally secured to the rearward end of said side-dump body at the upper end thereof by a fourth pivot pin;
a front adapter plate having upper and lower ends;
said upper end of said front adapter plate being mounted on said second pivot pin;
said upper end of said front adapter plate being fixed to said forward end of said side-dump body at the upper end thereof;
a front support selectively vertically adjustably secured to said front adapter plate below said upper end thereof;
a fifth horizontally disposed pivot pin extending forwardly from said front support;
a rear adapter plate having upper and lower ends;
said upper end of said rear adapter plate being mounted on said fourth pivot pin;
said upper end of said rear adapter plate being fixed to said rearward end of said side-dump body at the upper end thereof;
a rear support selectively vertically adjustably secured to said rear adapter plate below said upper end thereof;
a sixth horizontally disposed pivot pin extending rearwardly from said rear support;
a tarp adapted to be extended over said open upper end of said side-dump body;
and a tarp roll-up mechanism including front and rear swing arms, having inner and outer ends;
said inner ends of said front and rear swing arms being pivotally mounted on said fifth and sixth pivot pins respectively.

2. The combination of claim 1 wherein said wheeled frame is a truck.

3. The combination of claim 1 wherein said wheeled frame is a trailer.

4. In combination;
a wheeled frame;
a side-dump body, having upstanding forward and rearward ends and first and second sides, mounted on said wheeled frame;
said side-dump body having an open upper end;
a front hydraulic cylinder having a base end pivotally secured to said wheeled frame forwardly of said side-dump body by a first pivot pin, and a rod end pivotally secured to said forward end of said side-dump body at the upper end thereof by a second pivot pin;
a rear hydraulic cylinder having a base end pivotally secured to said wheeled frame rearwardly of said side-dump body by a third pivot pin and a rod end pivotally secured to the rearward end of said side-dump body at the upper end thereof by a fourth pivot pin;
a front adapter plate having upper and lower ends;
said upper end of said front adapter plate being mounted on said second pivot pin;
said upper end of said front adapter plate being fixed to said forward end of said side-dump body at the upper end thereof;
a fifth horizontally disposed pivot pin extending forwardly from said front adapter plate;
said fifth horizontally disposed pivot pin being selectively vertically adjustable with respect to said front adapter plate;
a rear adapter plate having upper and lower ends;
said upper end of said rear adapter plate being mounted on said fourth pivot pin;
said upper end of said rear adapter plate being fixed to said rearward end of said side-dump body at the upper end thereof;
a sixth horizontally disposed pivot pin extending rearwardly from said rear adapter plate;
said sixth horizontally disposed pivot pin being selectively vertically adjustable with respect to said rear adapter plate;
a tarp adapted to be extended over said open upper end of said side-dump body;
and a tarp roll-up mechanism including front and rear swing arms, having inner and outer ends;
said inner ends of said front and rear swing arms being pivotally mounted on said fifth and sixth pivot pins respectively.

* * * * *